United States Patent [19]

Barns et al.

[11] 4,310,341

[45] Jan. 12, 1982

[54] REMOVAL OF —OH IMPURITIES FROM FIBER OPTIC PRECURSOR MATERIALS

[75] Inventors: Robert L. Barns; Edwin A. Chandross, both of Berkeley Heights, N.J.

[73] Assignee: Bell Telephone Laboratories, Incorporated, Murray Hill, N.J.

[21] Appl. No.: 186,590

[22] Filed: Sep. 12, 1980

[51] Int. Cl.³ ............................................... C03C 25/00
[52] U.S. Cl. .................................... 65/3.12; 427/163;
210/754
[58] Field of Search ............... 210/754, 755, 756, 681;
427/163; 350/96.3; 65/3.12

[56] References Cited

U.S. PATENT DOCUMENTS

| | | | |
|---|---|---|---|
| 2,771,416 | 11/1956 | Ryan | 210/754 |
| 3,296,069 | 1/1967 | Kowalski | 210/755 |
| 3,733,266 | 5/1973 | Bishop | 210/754 |
| 3,929,637 | 12/1975 | Appleby | 210/756 |
| 3,944,487 | 3/1976 | Davis | 210/756 |
| 4,162,908 | 7/1979 | Rau | 427/163 |
| 4,217,027 | 8/1980 | MacChesney | 427/163 |

FOREIGN PATENT DOCUMENTS 2805824  2/1979  Fed. Rep. of Germany .

OTHER PUBLICATIONS

Purity Examination of Silicon and Germanium Halides by Long-Path Infrared Spectrophotometry, Rand, Analytical Chemistry, vol. 35. p. 2126-2131, (1963).
Chlorine Drying of a Doped Deposited Silica Preform Simultaneous to Consolidation, Aronson, Conference on Optical Fibers Communication, Mar. 6-8, 1979, Washington, D.C., IEEE catalog No. 79CH1431-6, QEA, pp. 54-55.
Moriyama, "Fabrication of Ultra-Low-OH Content Optical Fibers with VAD Method," Conference: Sixth European Conference on Optical Communication, York, England, 16-19, Sep. 1980.

*Primary Examiner*—Ernest G. Therkorn
*Attorney, Agent, or Firm*—Peter P. V. D. Wilde; James H. Fox

[57] ABSTRACT

The presence of hydroxyl impurities (—OH) in optical fiber precursor materials produces optical losses in fibers made from the precursor material, as in the modified chemical vapor deposition process. Typical precursor materials include $SiCl_4$, $GeCl_4$, $POCl_3$, and $PCl_3$. Losses due to —OH impurities occur near various wavelengths of current interest for optical communications systems. Adding chlorine and $PCl_3$ to impure $SiCl_4$, $GeCl_4$, or $POCl_3$ reduces the amount of —OH impurities and produces $POCl_3$ and HCl. The HCl may be readily removed, while the $POCl_3$ is typically left in the material. Bromine may be used instead of chlorine, and $PBr_3$ may be used instead of $PCl_3$. In addition, —OH impurities in $PCl_3$ may be removed by the addition of chlorine or bromine, with the resulting HCl or HBr typically being removed.

8 Claims, No Drawings

REMOVAL OF —OH IMPURITIES FROM FIBER OPTIC PRECURSOR MATERIALS

BACKGROUND OF THE INVENTION

1. Field of the Invention

This invention relates to the treatment of optical waveguide precursor materials to remove hydroxyl impurities therefrom.

2. Description of the Prior Art

The production of low-loss optical waveguides suitable for communications use is currently accomplished by a number of techniques, most of which comprise the oxidation of silicon tetrachloride to produce silica ($SiO_2$). One method of manufacture is by the modified chemical vapor deposition technique (MDVD), such as is described in U. S. Pat. No. 4,217,027, assigned to the same assignee as the present invention.

It is known that —OH—containing impurities in optical fibers produce increased optical losses at various wavelengths of interest in optical communications systems. For example, —OH absorption peaks are located at 0.95, 1.25, and 1.39 microns, among others. While silicon tetrachloride, which is oxidized to produce silica, typically forms the bulk of the optical fiber precursor material, various amounts of dopants are also included. Typical dopants include germanium and phosphorus. These are typically present in a silica optical fiber in the form of their respective oxides, typically $GEO_2$ and $P_2O_5$. These are also typically incorporated by oxidizing a chloride of the above-noted materials, as by the MCVD process. For example, $GeCl_4$ and $POCl_3$ are typically oxidized along with the $SiCl_4$ in varying amounts to produce the desired dopants in the optical fiber. Any —OH in the dopant chlorides also increases the amount of —OH in the optical fiber. It is known that the MCVD process partitions out some of the —OH-containing impurities in the oxidation process, reducing to some degree their incorporation in the optical fiber. Nevertheless, in the MCVD and certain other optical fiber production processes, it is desirable in some cases to reduce the amount of —OH impurities in the precursor materials.

SUMMARY OF THE INVENTION

We have invented a method of reducing the amount of —OH-containing impurities in optical fiber waveguide precursor chlorides including $SiCl_4$, $GeCl_4$, and $POCl_3$. This method comprises adding $PCl_3$ or $PBr_3$ to the precursor chlorides and additionally providing $Cl_2$ or $Br_2$ in the precursor chloride. These react with the —OH group in the precursor chloride to typically form HCl or HBr and $POCl_3$ or $POBr_3$. The HCl or HBr is then typically removed from the precursor chloride. Additionally, the —OH impurities in $PCl_3$ can be reduced by adding $Cl_2$ or $Br_2$, with the resulting HCl or HBr typically being removed.

DETAILED DESCRIPTION

The following detailed description relates to a method of reducing the level of —O H impurities in optical fiber precursor materials. By adding $PCl_3$ or $PBR_3$ and $Cl_2$ or $Br_2$ to $SiCl_4$ or $GeCl_4$ or $POCl_3$, the removal of —OH impurities may be effected. The following reaction sequences for purifying $SiCl_4$ are believed to be typical of the process:

$$PCl_3 + Cl_2 \rightarrow PCl_5 \qquad (1a)$$

$$PCl_5 + Cl_3Si\text{—}OH \rightarrow SiCl_4 + POCl_3 + HCl \qquad (1b)$$

The reaction sequences for the other above precursor materials proceed along similar lines. In addition, $PCl_3$ is itself a precursor chloride that is oxidized in some fiber optic processes and can be treated for —OH removal by reacting it with $Cl_2$ or $Br_2$. The following reaction sequence is believed to represent this latter process in the case of chlorine addition:

$$PCl_3 + Cl_2 \rightarrow PCl_5 \qquad (2a)$$

$$PCl_2\text{—}OH + PCl_5 \rightarrow PCl_3 + POCl_3 + HCl \qquad (2b)$$

In each case, a hydrogen halide, HCl, or HBr, is obtained along with the purified precursor material. The HCl or HBr may be removed by a variety of techniques, including bubbling a dry gas, typically nitrogen or oxygen, through the material. They may also be removed by stripper-column distillation or refluxing under an inert atmosphere, typically by blowing a dry inert gas across the opening of a reflux column. It is typically desirable to reduce the total HCl and HBr level to less than 0.04 molecular percent in the precursor chlorides for optical fiber production.

When chlorine is used as the halogen in practicing the present invention in the case of $SiCl_4$ or $GeCl_4$ precursor material, the chlorine is typically provided in the precursor chloride for effecting a chlorination purification process. For example, it is known that trichlorosilane ($SiHCl_3$), a common impurity in $SiCl_4$, is converted into $SiCl_4$ and HCl upon reaction with chlorine; see *A Comprehensive Treatise On Inorganic And Theoretical Chemistry*, J. W. Mellor, Volume VI, page 969 (1925). In addition, it is well known that irradiating $Cl_2$ with ultraviolet light increases its activity by initiating free-radical chain reactions. Thus, in the ultraviolet chlorination technique, the ultraviolet radiation dissociates some of the $Cl_2$ molecules into atomic chlorine, which reacts with impurities containing hydrogen not bound as —OH groups, to form HCl. The HCl may then be removed. The present inventors have found that still another type of hydrogen-containing impurity that can be removed from $SiCl_4$ by the ultraviolet chlorination technique is a —$CH_x$-containing impurity, wherein x ranges from 1 to 3, with still others possible. In addition, we have found that the ultraviolet chlorination technique removes hydrogen-containing impurities from $GeCl_4$. Further details of this technique can be found, for example, in German Patent (Offen) NO. 2,805,824. As used herein, the term "other hydrogen-containing impurity" means any hydrogen-containing impurity in the precursor chloride other than HCl or an impurity-containing hydrogen only in the form of an —OH group.

In practicing the present invention with chlorine as the halogen, it is typically added until the yellow color of excess $Cl_2$ is observed. This typically occurs at a $Cl_2$ concentration on the order of 0.1 weight percent of the precursor chloride. The chlorine is advantageously added by bubbling it through the liquid precursor chloride to ensure good mixing. When used in conjunction with the ultraviolet chlorination process, the present invention may be practiced before or after the ultraviolet irradiation step. However, the present technique is not limited to use with the ultraviolet chlorination process. In addition, the chlorine or bromine may be provided from other sources in the precursor chlorides, including ancillary side reactions. The foregoing principles will be more fully illustrated by means of the following Examples.

EXAMPLE 1

Liquid silicon tetrachloride is the precursor material in this Example, having an initial —OH concentration of approximately 5 parts per million by weight. To the impure silicon tetrachloride is added approximately 0.1 percent $Cl_2$ gas and approximately 0.1 percent liquid $PCl_3$ by weight. The mixture was allowed to stand for approximately 4 hours. The —OH concentration was determined to be approximately 4 parts per million. After standing for 60 hours, the —OH concentration was determined to be 1.9 parts per million.

EXAMPLE 2

The precursor material is liquid $GeCl_4$, having an —OH concentration of approximately 60 parts per million. To this was added 0.1 percent $Cl_2$ gas and 50 parts per million liquid $PCl_3$. This was thoroughly mixed and allowed to stand approximately 18 hours. The amount of —OH was then determined to be approximately 1.7 parts per million.

EXAMPLE 3

The precursor material in this Example is liquid $POCl_3$, having an initial —OH concentration of greater than 10 parts per million. To this was added 0.1 percent $Cl_2$ gas and 0.05 percent liquid $PCl_3$. After mixing and standing for a period of a few hours, the —OH concentration was determined to be less than 1 part per million.

EXAMPLE 4

The precursor material in this Example is liquid $PCl_3$ having an initial —OH concentration of greater than 20 parts per million by weight. To this was added 0.2 percent $Cl_2$ gas by weight. The —OH concentration was then determined to be approximately 7 parts per million. An additional 0.2 percent of $Cl_2$ gas was then added, and the —OH concentration was determined to be approximately 5 parts per million.

The above Examples were performed at a temperature of about 20 degrees C. As would be expected, it has been found that these reactions proceed more quickly at an elevated temperature. However, the purification of $PCl_3$, as in Example 4, proceeds almost immediately upon the addition of the chlorine gas. In practice, the impure chlorides prior to the inventive treatment typically have an —OH level in excess of 10 parts per million by weight. For optical fiber production, the inventive treatment is typically conducted so as to reduce the —OH level to less than 10 parts per million and preferably less than 5 parts per million by weight.

In the above Examples, the level of HCl that is produced by the above reactions may be reduced by a number of techniques. One effective technique is to bubble dry nitrogen gas, or dry oxygen or air, through the mixture. Another effective method is the use of a molecular sieve. For this purpose, a Linde 5A molecular sieve, with channels of effective diameter of less than approximately 5 Angstroms, can be used in the case of $SiCl_4$. This sieve is a sodium-calcium-aluminosilicate. The sieve is activated at a temperature of 350 to 400 degrees C for several hours in a flow of nitrogen to ensure dryness. Silicon tetrachloride is pumped through a bed of the sieve, and the HCl is removed thereby. It is believed that $GeCl_4$, and perhaps $POCl_3$ and $PCl_3$, can be similarly treated for HCl or HBr removal.

The $POCl_3$ or $POBr_3$ (or chloro-bromo intermediates thereof) remaining in the reacted material may be removed by a variety of techniques, if desired. However, phosphorus is a typical dopant in fiber optic materials, and hence small amounts of these compounds may be left in the precursor materials, if desired. Similarly, since an excess amount of halogenated $PCl_3$ or $PBr_3$ is typically employed in the above reactions, the unreacted amounts of these materials may be removed by a variety of techniques or may be left in the precursor material as a useful dopant thereof. In this latter case, these materials are thus introduced, along with the precursor chlorides, into the oxidation zone wherein they are oxidized. However, in the MCVD process, the liquid precursor chlorides are typically separately vaporized prior to entry into the oxidation zone wherein they are oxidized. The different vapor pressures of the reactants and reaction products can result in the precursor chloride vapor being substantially free of the above reactants and products thereof upon entry into the oxidation zone. While the material purified by the foregoing techniques may advantageously be employed in making optical fiber waveguides, it may also be advantageously employed in making a number of other optical components. For example, optical waveguides deposited on a substrate material may advantageously be made from materials purified by the present technique. In addition, it is known to be desirable to remove —OH impurities from $POCl_3$ when it is used as an aprotic solvent for $Nd^{3+}$ liquid lasers; see "Comparison of Aprotic Solvents for $Nd^{3+}$ Liquid Laser Systems: Selenium Oxychloride and Phosphorus Oxychloride", C. Brecher et al, *The Journal of Physical Chemistry*, Vol. 73, pages 1785–1789 (1969). All such variations and deviations through which the present technique has advanced the art are considered to be within the spirit and scope of the present invention.

We claim:

1. A method of reducing the amount of hydroxyl (—OH) containing impurities in an impure liquid chloride selected from the group consisting of $SiCl_4$, $GeCl_4$, and $POCl_3$, CHARACTERIZED by reacting with said impure chloride a mixture of a first reactant selected from the group consisting of $PCl_3$ and $PBr_3$ and a second reactant selected from the group consisting of chlorine and bromine.

2. The method of claim 1 FURTHER CHARACTERIZED in that said first reactant is $PCl_3$, and said second reactant is chlorine.

3. The method of claim 1 FURTHER CHARACTERIZED by irradiating said impure chloride with ultraviolet light in order to reduce the amount of other hydrogen-containing impurities, wherein said second reactant is chlorine.

4. A method of reducing the amount of hydroxyl (—OH)-containing impurities in impure $PCl_3$ CHARACTERIZED by reacting $Cl_2$ or $Br_2$ impure $PCl_3$.

5. The method of claims 1 or 4 FURTHER CHARACTERIZED by reducing the total amount of HCl and HBr in said chloride after said reacting step to less than 0.04 molecular percent.

6. The method of claim 5 FURTHER CHARACTERIZED by reducing the amount of HCl or HBr in said chloride by passing said chloride over a molecular sieve, whereby at least a portion of said HCl or HBr is adsorbed in said sieve.

7. A method of making an optical fiber wherein said method of making said fiber includes the step of completely oxidizing with oxygen in an oxidation zone at least one chloride selected from the group consisting of $SiCl_4$, $GeCl_4$, $POCl_3$, and $PCl_3$, CHARACTERIZED by purifying said chloride prior to said oxidizing according to the method of claims 1, 2, 3, or 4.

8. The method of claim 7 FURTHER CHARACTERIZED by introducing $POCl_3$ or $POBr_3$ or chlorobromo intermediates thereof produced by said reacting step into said oxidation zone along with said at least one chloride.

* * * * *

UNITED STATES PATENT AND TRADEMARK OFFICE
CERTIFICATE OF CORRECTION

PATENT NO. : 4,310,341
DATED : January 12, 1982
INVENTOR(S) : Robert L. Barns and Edwin A. Chandross It is certified that error appears in the above—identified patent and that said Letters Patent is hereby corrected as shown below:

Column 1, line 16, "(MDVD)" should read --(MCVD)--.
Column 1, line 62, "-O H" should read -- -OH--.
Column 3, line 32, "$Cl_2$gas" should read --$Cl_2$ gas--.
Column 4, line 61, after "$Br_2$" add --with said--.

Signed and Sealed this

Fifteenth Day of June 1982

[SEAL]

Attest:

Attesting Officer

GERALD J. MOSSINGHOFF

Commissioner of Patents and Trademarks